(No Model.)

R. S. LOVELACE.
CRANK.

No. 503,865. Patented Aug. 22, 1893.

WITNESSES
Fred. Gould
Lorin H. Lathrop

INVENTOR
Robert Samuel Lovelace

UNITED STATES PATENT OFFICE.

ROBERT SAMUEL LOVELACE, OF HENSTRIDGE, ASSIGNOR TO W. A. LLOYD & CO., OF BIRMINGHAM, ENGLAND.

CRANK.

SPECIFICATION forming part of Letters Patent No. 503,865, dated August 22, 1893.

Application filed September 9, 1891. Serial No. 405,215. (No model.) Patented in England April 19, 1890, No. 5,968.

*To all whom it may concern:*

Be it known that I, ROBERT SAMUEL LOVELACE, cycle manufacturer, a subject of the Queen of Great Britain, residing at Henstridge, in the county of Somerset, England, have invented certain new and useful Improvements in Cranks for Velocipedes, (for which I have obtained Letters Patent in Great Britain, dated April 19, 1890, No. 5,968;) and I do hereby declare the following to be a full, clear, and exact description of the invention, reference being had to the accompanying drawings, which form part of this specification.

This invention relates to improvements in attachable and detachable cranks for velocipedes, and consists in providing their inner ends, with open-ended and clip-like connections, which when closed by bolts or set screws, grip the axles or spindles.

Figure 1:
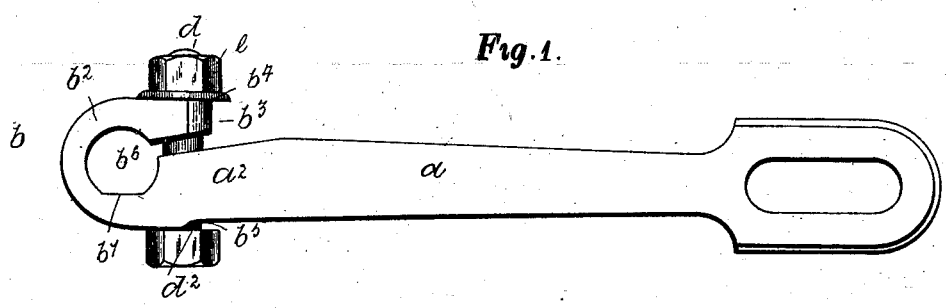
Figure 2:
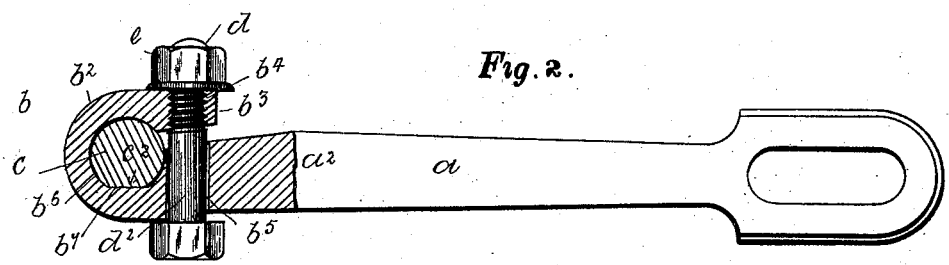
Figure 3:
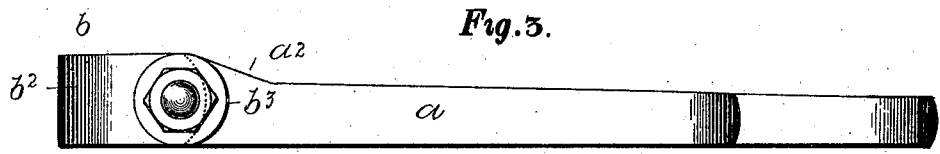

Figure 1 of the accompanying drawings, represents in side elevation, a crank, provided with an axle embracing clip, constructed and arranged according to my invention. Thus the inner end of the crank, has an encircling clip, which is closed or drawn to upon the axle or spindle, by a screw-bolt or set screw. Fig. 2 represents an elevation of the same, with the inner end in section, but embracing the end of an axle or spindle, while Fig. 3 is an edge view of the said crank and Fig. 4 a side elevation of a crank having the inner end in section, in which the clip is of a modified form.

$a$ is a crank, having its inner and attachable end $b$, made in the form of a continuous clip, adapted to embrace or pass around, the end of a spindle $c$. The said continuous clip end $b$, consists of a nearly circular gripping band $b^2$, terminated by a free end or extension $b^3$, having a transversely directed and plain hole $b^4$, through it; and which hole comes opposite to, or coincident with a like plain hole $b^5$, directed through the inner shank end $a^2$, of the crank $a$, and through these said holes, the shank $d^2$, of a screw bolt, or set pin $d$, passes. The eye, or inside part $b^6$, of the said clip end $b$, has a flat $b^7$, which takes upon a like flat $c^2$, of the axle or spindle $c$, whereby the said crank, when affixed, is prevented from rotating. The screwing up of the nut $e$, closes or draws the band of the clip, rigidly around the axle, spindle or shaft. Hence the securing of the same upon the said axle, spindle or shaft, without the use of collars or pins, now commonly employed. It will be seen that the clip, grips or embraces the axle or spindle to nearly the whole of its circumference.

Figure 4:
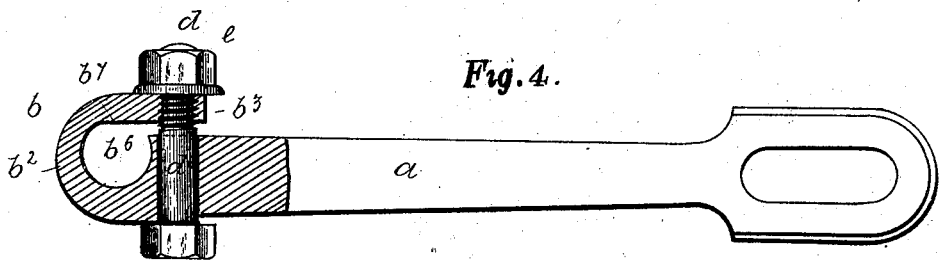

Fig. 4 represents a crank, with another form of clip. In this arrangement the flat $b^7$, is upon the top side of the eye or orifice $b^6$, instead of upon the bottom as in Figs. 1, 2 and 3.

Having fully described my invention, what I desire to claim and secure by Letters Patent is—

In a cycle crank, the crank arm $a$ having at one end a clip, consisting of the gripping band $b^2$, shank end $a^2$, and extension $b^3$, said band being shaped to form a circular or cylindrical eye $b^6$ for the reception of the spindle $c$, and flattened on one of its sides, as indicated at $b^7$, in combination with the screw bolt $d$, and nut $e$, said screw bolt passing through the shank end $a^2$ and extension $b^3$, outside the eye $b^2$ and clear of the spindle, the inner face of the extension $b^3$ and opposing face of the shank end $a^2$ being separated by a space which permits of the adjustment of the extension $b^3$ and of the enlargement or diminution of the eye or spindle opening $b^6$, substantially as described.

In testimony that I claim the foregoing I have hereunto set my hand this 1st day of August, 1891.

ROBERT SAMUEL LOVELACE. [L. S.]

Witnesses:
FREDK. GOULD,
LORIN A. LATHROP.